United States Patent
Steidl et al.

(10) Patent No.: US 11,761,513 B2
(45) Date of Patent: Sep. 19, 2023

(54) CRANKSHAFT ARRANGEMENT COMPRISING A TORSIONAL VIBRATION DAMPER

(71) Applicant: Hasse & Wrede GmbH, Berlin (DE)

(72) Inventors: Michael Steidl, Berlin (DE); Norbert Reinsperger, Hoppegarten (DE)

(73) Assignee: Hasse & Wrede GmbH, Berlin (DE)

( * ) Notice: Subject to any disclaimer, the term of this patent is extended or adjusted under 35 U.S.C. 154(b) by 0 days.

(21) Appl. No.: 17/776,905

(22) PCT Filed: Nov. 13, 2020

(86) PCT No.: PCT/EP2020/082090
§ 371 (c)(1),
(2) Date: May 13, 2022

(87) PCT Pub. No.: WO2021/094557
PCT Pub. Date: May 20, 2021

(65) Prior Publication Data
US 2022/0412435 A1   Dec. 29, 2022

(30) Foreign Application Priority Data
Nov. 15, 2019 (DE) ...................... 10 2019 130 924.7

(51) Int. Cl.
*F16F 15/173* (2006.01)

(52) U.S. Cl.
CPC ...... *F16F 15/173* (2013.01); *F16F 2228/063* (2013.01)

(58) Field of Classification Search
CPC .. F16F 15/173; F16F 15/126; F16F 2228/063; F16C 3/06
See application file for complete search history.

(56) References Cited

U.S. PATENT DOCUMENTS 5,191,811 A   3/1993  Kogure
5,377,962 A *  1/1995 Ochs .................. F16D 3/50
                                            267/281

(Continued)

FOREIGN PATENT DOCUMENTS

DE    102006004551 A1 *  8/2007  ............ F16F 15/124
DE    10 2007 052 284 A1   5/2009

(Continued)

OTHER PUBLICATIONS

German-language Written Opinion (PCT/ISA/237) issued in PCT Application No. PCT/EP2020/082090 dated Feb. 22, 2021 (five (5) pages).

(Continued)

*Primary Examiner* — Daniel D Yabut
(74) *Attorney, Agent, or Firm* — Crowell & Moring LLP (57) ABSTRACT

A crankshaft arrangement for an internal combustion engine includes a crankshaft, a torsional vibration damper having a primary mass and a flywheel, wherein the primary mass is connected fixedly to the crankshaft, and the flywheel and the primary mass are coupled via a viscous fluid. The torsional vibration damper is attached to an output end of the crankshaft. The primary mass is coupled to a secondary coupling via an elastomer coupling ring. The torsional vibration damper is coupled to the secondary coupling via a feedback device. The feedback device has a negative stiffness.

14 Claims, 7 Drawing Sheets

(56) References Cited

U.S. PATENT DOCUMENTS

| | | | |
|---|---|---|---|
| 2015/0165858 A1 | 6/2015 | Suissa | |
| 2019/0113101 A1* | 4/2019 | Steidl | .................... F16F 15/126 |

FOREIGN PATENT DOCUMENTS

| | | | | |
|---|---|---|---|---|
| DE | 10 2013 101 671 A1 | 8/2014 | | |
| DE | 10 2014 118 609 A1 | 6/2015 | | |
| DE | 10 2017 004 356 A1 | 11/2018 | | |
| DE | 102017004356 A1 * | 11/2018 | | |
| EP | 1146255 A2 * | 10/2001 | ............ | F16F 15/126 |
| EP | 3 521 656 A1 | 8/2019 | | |
| JP | 8-14332 A | 1/1996 | | |
| WO | WO 2005/038293 A1 | 4/2005 | | |
| WO | WO 2017/158131 A2 | 9/2017 | | |
| WO | WO-2017158131 A2 * | 9/2017 | ................ | F16C 3/06 |
| WO | WO 2019/185196 A1 | 10/2019 | | |

OTHER PUBLICATIONS

International Preliminary Report on Patentability (PCT/IB/326 & PCT/IB/373) issued in PCT Application No. PCT/EP2020/082090 dated May 27, 2022, Including English translation of document C2 (German-language Written Opinion (PCT/ISA/237), filed on May 13, 2022) (six (6) pages).

International Search Report (PCT/ISA/210) issued in PCT Application No. PCT/EP2020/082090 dated Feb. 22, 2021 with English translation (four (4) pages).

Japanese-language Written Opinion (PCT/ISA/237) issued in PCT Application No. PCT/EP2020/082090 dated Feb. 22, 2021 (five (5) pages).

German-language Office Action issued in German Application No. 10 2019 130 924.7 dated May 6, 2020 (nine (9) pages).

* cited by examiner

CRANKSHAFT ARRANGEMENT COMPRISING A TORSIONAL VIBRATION DAMPER

BACKGROUND AND SUMMARY

The invention relates to a crankshaft arrangement with a torsional vibration damper. The invention also relates to a method for damping torsional vibrations of a crankshaft of an internal combustion engine.

Crankshafts of a reciprocating piston internal combustion engine are frequently connected to associated drive trains (for example, transmissions, generators, etc.) via elastic couplings (elastomer coupling) which isolate the drive trains from the torsional non-uniformities of the reciprocating piston engine. Torsional non-uniformities of a shaft are to be understood to mean rotational speed fluctuations of the entire shaft.

The isolation frequency, that is to say the frequency above which vibrations are no longer transmitted, mainly results from the rigidity of the elastomer coupling, a low rigidity leading to a lower isolation frequency. This frequency cannot be selected to be arbitrarily low, however, since the elastomer coupling cannot otherwise transmit the static torque and the static torsion angle becomes so great that the stresses in the elastomer material exceed the permissible limit. A compromise therefore has to be found between the degree of isolation and the durability of the elastomer coupling.

In addition, there are further possibilities for reducing the torsional non-uniformities, by, for example, what is known as a tuned mass damper or an adaptive rotational speed absorber being used. To this end, an additional seismic mass is connected to the system, and energy is diverted out of the system to be damped into the vibration of the seismic mass by way of suitable selection of the coupling parameters of the seismic mass, as a result of which a torque is generated which calms the main system. The costs of the system with the seismic mass are considered to be disadvantageous here.

Document WO 2017/158 131 A2 describes a crankshaft arrangement with a torsional vibration damper. This specified combination which is also referred to as a so-called Flywheel Integrated Damper and Coupling (FIDC) makes it possible for torsional vibrations to be damped and for the drive train to be isolated. It is considered to be disadvantageous here that the isolation of the drive train does not provide any substantial advantages in comparison with conventional construction, in the case of which the crankshaft is provided with a damper at a front end and with a coupling at the other end.

For vibration isolation, components with so-called negative mechanical rigidities have been proposed. The required component which forms a negative mechanical rigidity of this type can be realized only in a relatively complex manner as hardware. Systems which have negative rigidity usually do this only in a very limited operating range. Examples are, for example, cup springs which are operated at the "breakthrough point". Solutions which exhibit negative rigidity over a relatively large operating range or relatively large transverse displacement are active elements, in the case of which the mechanical behavior has to be realized via a regulation operation.

Document WO 2019/185 196 A1 describes linear magnetic fields and the use in vibration absorbers: "the linear magnetic springs can also be used as "negative springs". As in the case of a "positive spring", there is no force (torque) in the center or starting position. If the moving part deviates from this position, a restoring force (torque) is not produced, but rather a deflecting force (torque) which rises in a linear manner with the deflection from the center starting position".

The document from Mitsubishi Electric Corporation— Public Relations Division No. 3251, published on Feb. 7, 2019 (https://de.mitsubishielectric.com/de/news-events/releases/global/2019/0207-b/pdf/190207-b_3251_de_de.pdf) describes a passive apparatus with a negative rigidity for the regulation of the rope vibrations in elevators in tower blocks. A negative rigidity is a known principle. Here, a force acts in the opposite direction counter to the restoring force of a normal spring. The negative rigidity is achieved by way of permanent magnets which are positioned so as to face one another, in order to clamp the rope in between.

Further examples for the use of negative rigidities are still to be specified.

For instance, document EP 3 521 656 A1 illustrates a vibration isolation apparatus with a negative rigidity.

Document DE 10 2014 118 609 A1 describes a method and an apparatus for active suspension damping with a negative rigidity.

It is therefore the object of the invention to provide a crankshaft arrangement with improved isolation of the drive train.

One concept of the invention is based on the finding that an additional coupling of the components which are already present in the Flywheel Integrated Damper and Coupling FIDC leads to it being possible for the isolation of the drive train to be improved decisively. This additional coupling is the coupling of the vibration damper ring (of the absorber mass) to the secondary side of the coupling. It is decisive here that this additional coupling has a negative rigidity (stiffness), as a result of which the desired behavior is configured.

A crankshaft arrangement according to the invention for an internal combustion engine comprises a.) a crankshaft; b.) a torsional vibration damper with a primary mass and a vibration damper ring; c.) the primary mass being connected fixedly to the crankshaft, and the vibration damper ring and the primary mass being coupled via a viscous fluid; d.) the torsional vibration damper being attached to an output end of the crankshaft; e.) the primary mass being coupled via an elastomer coupling ring to a secondary coupling. The torsional vibration damper is coupled to the secondary coupling via a feedback device.

In one preferred embodiment, the feedback device has a negative rigidity. An advantageously substantial reduction of torsional vibrations and torsional non-uniformities can be achieved by way of this additional coupling with the negative rigidity. A desired behavior can therefore be configured with the negative rigidity. Even if mechanical components with a negative rigidity individually behave in an unstable manner, the stability of the overall system can be achieved by way of the further components which are already present.

This results in the advantage that, as a result of the feedback device, the secondary side of the drive train can have considerably fewer torsional non-uniformities than in the prior art.

A further advantage consists in that lower loading of the components of the drive train can be achieved, such as lower transmission wear, for example. In the case of a generator, the "cleanness" of a sine wave of the generated alternating current can be increased, that is to say frequency stability and amplitude stability can be improved.

A method according to the invention for damping torsional vibrations of a crankshaft of the above-specified crankshaft arrangement comprises a first method step (S1), in which an apparatus is provided which has a torsional vibration damper with a primary coupling with a primary mass and with an outer vibration damper ring and a secondary coupling with an elastomer coupling ring, torsional vibration damping taking place in a second method step (S2) by means of coupling of the vibration damper ring to the primary mass, further damping being carried out by means of coupling of the primary mass for its part to the secondary coupling. In a third method step (S3), damping of the torsional vibrations and at the same time isolating of a drive train are carried out by means of a negative rigidity which brings about feedback of the secondary coupling to the vibration damper ring.

This type of coupling by means of a negative rigidity is particularly advantageous in contrast to the prior art, since an improved reduction of torsional non-uniformities and simultaneous highly satisfactory isolation of a drive train of a crankshaft can therefore be achieved in contrast to the prior art.

In a further embodiment, the vibration damper ring of the torsional vibration damper is an outer vibration damper ring, to which the feedback device is coupled. This is advantageous, since the vibration damper ring is thus easily accessible from the outside for the feedback device.

In another embodiment, the negative rigidity has spring elements. Springs are customary components which are advantageously available on the market inexpensively and at a high quality.

Here, the spring elements of the negative rigidity of the feedback device are attached in a manner which is distributed uniformly on the circumference of an outer ring of the secondary coupling and on an opposite edge of the vibration damper ring of the torsional vibration damper, and extend in the radial direction. This results in an advantageous, simple and space-saving construction.

It is advantageous if the spring elements of the negative rigidity of the feedback device in each case have at least one prestressed helical spring. In this way, each spring can advantageously be set and adapted simply.

In one preferred embodiment, the feedback device with the negative rigidity has four or more spring elements.

In an alternative embodiment, the negative rigidity of the feedback device has magnetic elements. This is advantageous, since these customary components are advantageously available on the market inexpensively and at a high quality.

In a further embodiment, first magnetic elements are thus attached in a manner which is distributed uniformly on the circumference of an edge of the vibration damper ring, second magnetic elements being attached in a manner which is distributed uniformly on the circumference of an outer ring of the secondary coupling. This construction is compact and space-saving.

In one preferred embodiment, the feedback device with the negative rigidity can have at least four or more first magnetic elements and at least four or more second magnetic elements. The advantage here is the capability of adaptation to different uses.

Another embodiment provides that an angle between in each case two adjacent first magnetic elements and an angle between in each case two adjacent second magnetic elements about a rotational axis is 90°, an angle in each case between a first magnetic element and a second magnetic element about the rotational axis having a value of 45°. This construction is advantageously simple and compact.

In another embodiment, the first magnetic elements point with a north pole toward the rotational axis, the second magnetic elements pointing with a north pole toward the rotational axis. This is advantageous for setting the negative rigidity.

Furthermore, it is advantageous that the magnetic elements are permanent magnets which are available as customary components inexpensively and at a high quality.

If the magnetic elements are configured as electromagnets, the values of the negative rigidity can be set, adapted and also regulated in a manner which is dependent on corresponding parameters via a corresponding control apparatus. In this way, a positive feedback amplifier can advantageously be realized.

A combination of permanent magnets and electromagnets can also be advantageous in certain uses.

A further combination of spring elements and magnetic elements is likewise contemplated and advantageously extends a capability of adaptation to different uses.

One exemplary embodiment of the invention will be described in the following text on the basis of the appended drawings.

DETAILED DESCRIPTION OF THE DRAWINGS

Figure 1:
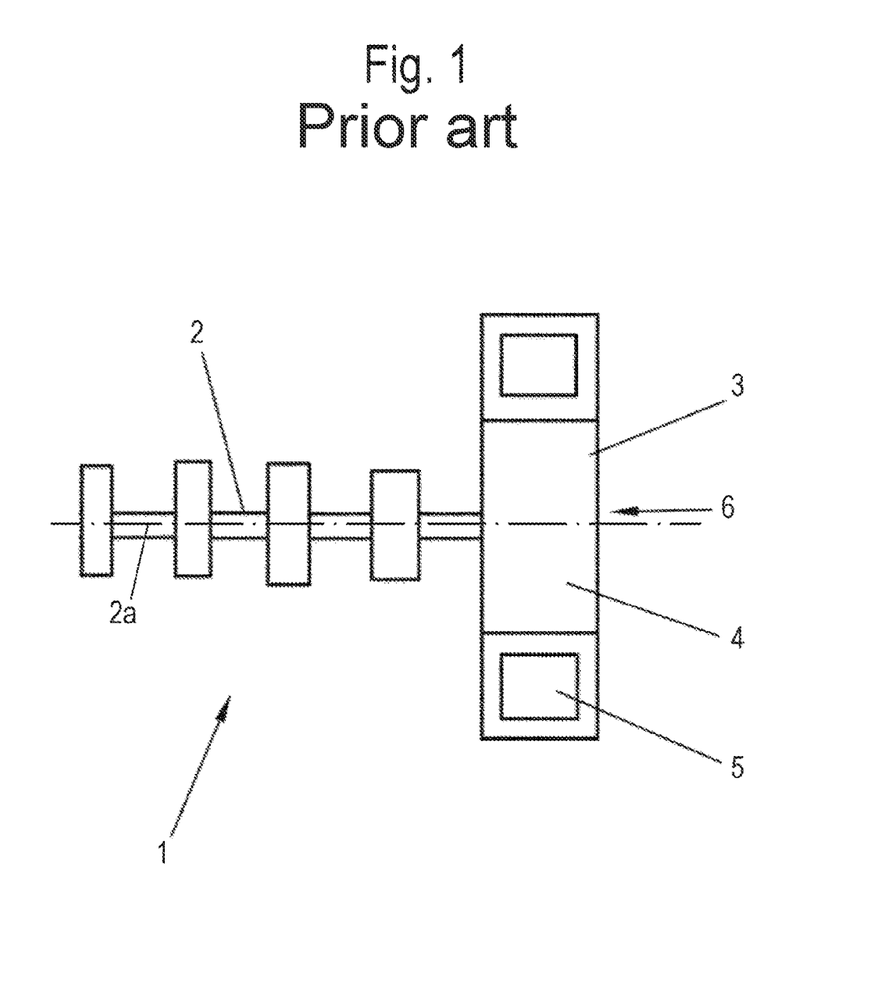
FIG. 1 shows a crankshaft arrangement according to the prior art.

FIG. 1 shows a crankshaft arrangement according to the prior art.

Figure 2:
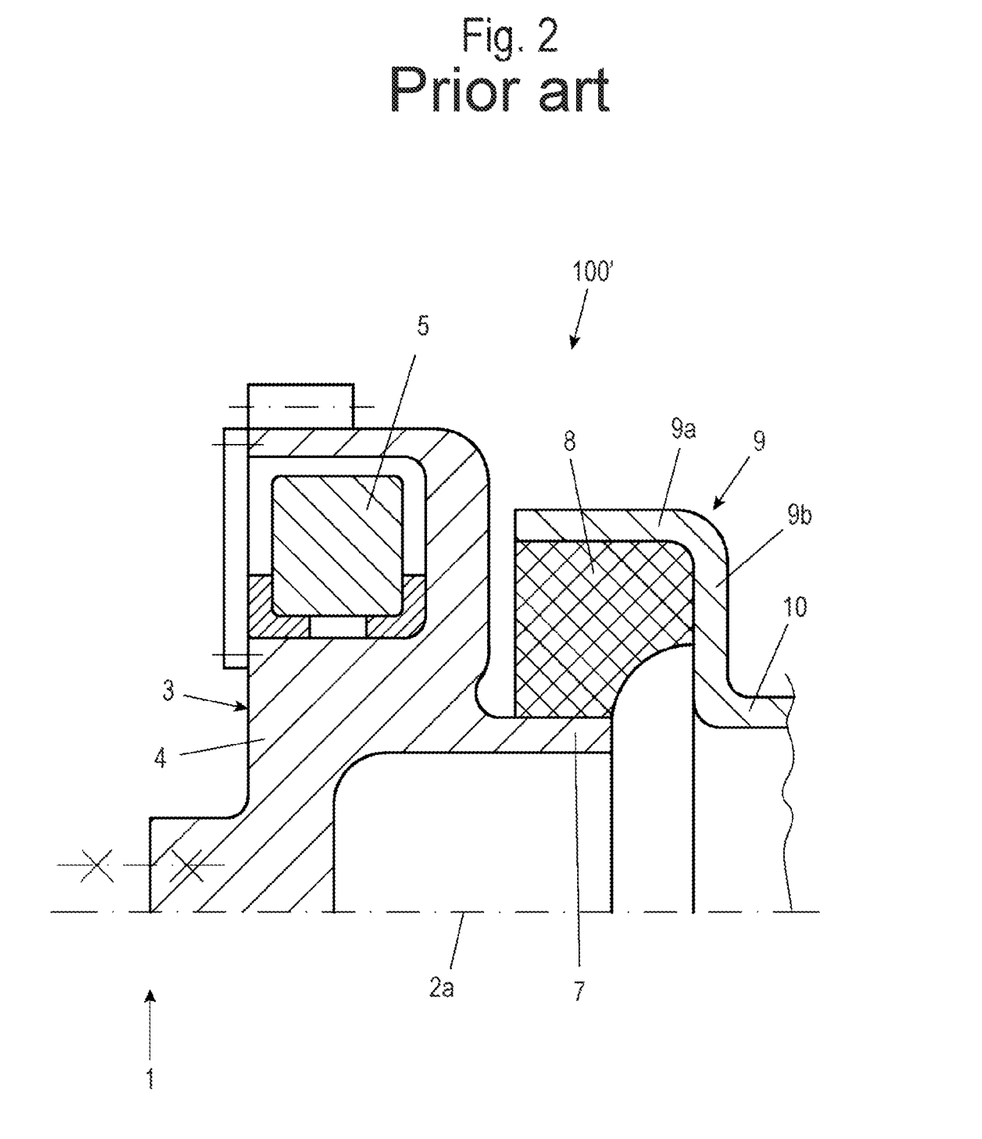
FIG. 2 shows a section of a further crankshaft arrangement and an apparatus for damping torsional vibrations according to the prior art.

FIG. 2 illustrates a section of a further crankshaft arrangement and an apparatus 100' for damping torsional vibrations according to the prior art.

The crankshaft arrangement 1 is particularly suitable for a reciprocating piston engine, in particular for an internal combustion engine. A crankshaft 2 with a rotational axis 2a is connected at a drive end 6 to a torsional vibration damper 3. Therefore, the torsional vibration damper 3 is situated at an original position of the flywheel (not shown).

Since the torsional vibration damper 3 also assumes the task of the reduction of the torsional non-uniformity of the engine, to which the crankshaft 2 is assigned, it requires suitable tuning between a primary mass 4 which is connected fixedly to the crankshaft 2 and a secondary mass 5 which is attached on the primary mass 4 in a seismically, elastically damping manner.

The suitable tuning brings it about that, at a low rotational speed, that is to say at low frequencies, the connection between the primary mass 4 and the secondary mass 5 can be considered to be rigid. The two masses 4, 5 form, as it were, one unit and act as a flywheel at low rotational speeds. In this situation, torsional vibrations play a subordinate role in an engine. A further flywheel is not necessary in the case of a crankshaft arrangement 1 of this type.

At a relatively high rotational speed, that is to say at relatively high frequencies, the larger secondary mass 5 comes into play and damps the torsional vibrations. The torsional vibration damper 3 operates in its original form. In this operating state, that is to say at high rotational speeds, the torsional non-uniformity plays a subordinate role.

The crankshaft arrangement 1 shown in the example shows an outline sketch for a four-cylinder engine. The invention is not to be restricted hereto; it can also be used as a crankshaft arrangement of engines with a lower or higher number of cylinders, in particular with six, eight, ten, twelve or more cylinders or else of V-engines with up to 20 cylinders.

The torsional vibration damper 3 in FIG. 2 is, for example, a viscosity damper and has the primary mass 4 which is connected fixedly to the crankshaft and the secondary mass 5 which is configured here as a ring which can rotate in a chamber of the primary mass 4, a gap between these two masses being filled with a viscous medium, for example silicone oil. Suitable tuning also brings it about here that, at a low rotational speed, that is to say at low frequencies, the primary mass 4 and the secondary mass 5 can be considered to be one unit.

A coupling functional section with an elastomer coupling ring 8 is also integrated directly into the torsional vibration damper 3 and forms a secondary coupling 9. The elastomer coupling ring 8 is connected on one side to a hub-like inner ring 7 of the primary mass 4 and on the other side to an outer ring 8 of the secondary coupling 9. The outer ring 8 is coupled via a connecting section 9*b* to an output 10, for example an input element of a transmission (otherwise not shown) which belongs to a drive train (likewise not shown but contemplated).

This embodiment is also called a "Flywheel Integrated Damper and Coupling" (FIDC).

Figure 3:
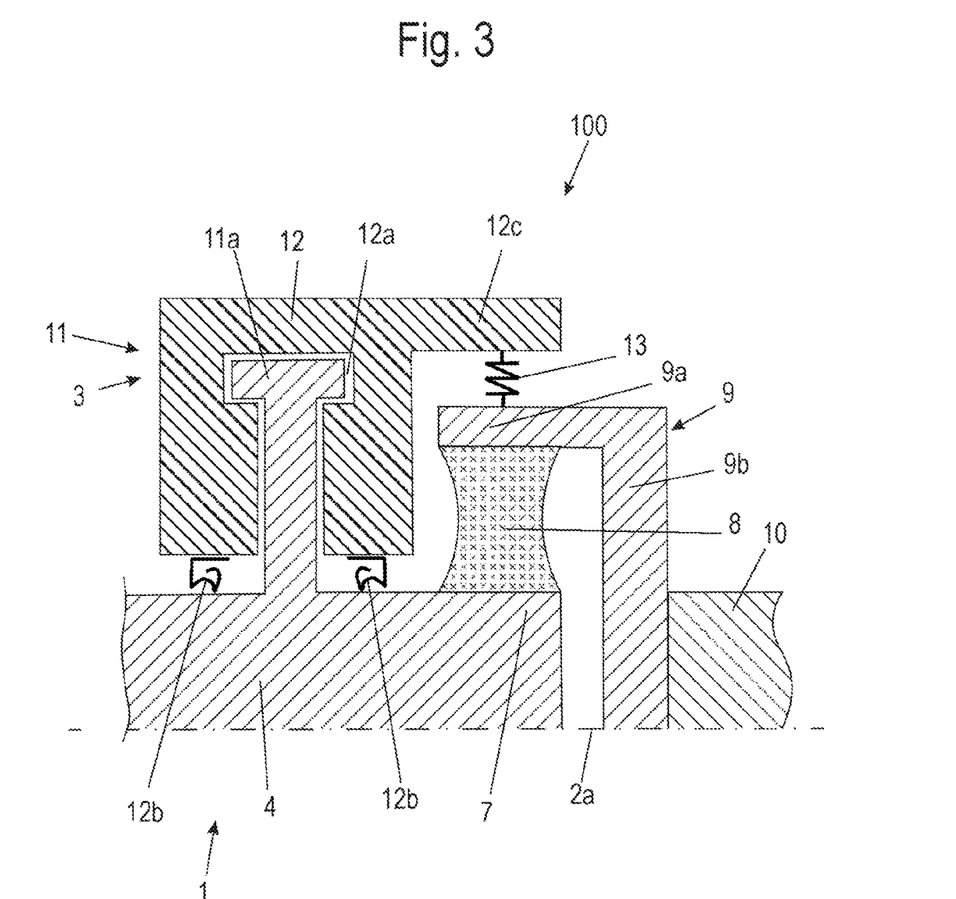
FIG. 3 shows a section of a crankshaft arrangement according to the invention with one exemplary embodiment of the apparatus according to the invention for damping torsional vibrations.

FIG. 3 shows a section of a crankshaft arrangement 1 according to the invention with one exemplary embodiment of the apparatus 100 according to the invention for damping torsional vibrations.

The apparatus 100 comprises a primary coupling 11 as viscosity torsional vibration damper 3 with a primary mass 4 and a vibration damper ring 12, a secondary coupling 9 with an elastomer coupling ring 8, and a feedback device 13.

A vibration damper ring 12 is coupled to the primary mass 4. This is shown in FIG. 3 by way of example as a primary coupling 11.

The primary coupling 11 comprises the primary mass 4 which is connected to the crankshaft 2 and has a damper element 11*a* which is disk-shaped here with a circumferential collar, and the vibration damper ring 12 with a chamber 12*a*, in which the damper element 11*a* is received with a fluid which is not described in greater detail. The chamber 12*a* is sealed by means of seals 12*b* which are not described in greater detail with respect to the shaft of the primary mass 4. This construction has a certain rigidity and damping action.

In contrast to the vibration damper ring 5 from the prior art as shown in FIG. 2, the vibration damper ring 12 is configured here as an outer vibration damper ring 12. The vibration damper ring 12 additionally has a circumferential edge 12*c* which points toward the output 10. The edge 12*c* will be described further below.

The primary mass 4 for its part is additionally coupled to the secondary coupling 9. This coupling is shown in FIG. 3 by way of example by way of the elastomer coupling ring 8 with its connections on one side to the hub-like inner ring 7 of the primary mass 4 and on the other side to the outer ring 8 of the secondary coupling 9.

In contrast to the prior art, the vibration damper ring 12 is coupled via a rigidity to the secondary coupling 9. This rigidity is configured here as what is known as a negative rigidity of the feedback device 13. The feedback device 13 connects the edge 12*c* of the vibration damper ring 12 to the outer ring 9*a* of the secondary coupling 9.

The feedback device 13 forms an additional coupling of the components which are already present in the case of the FIDC (see FIG. 2), and leads to it being possible for the isolation of the drive train to be improved decisively. This additional coupling is the coupling of the vibration damper ring 12 (the absorber mass) to the secondary side of the secondary coupling 9, that is to say to the outer ring 9*a*. It is decisive here that this additional coupling has to have a negative rigidity, in order that the desired behavior is configured. Mechanical components with a negative rigidity individually behave in an unstable manner, and the stability of the overall system is achieved by way of the further couplings which are already present.

The coupling of the vibration damper ring 12 to the secondary coupling 9 by means of a negative rigidity can take place via various technical approaches, for example via correspondingly arranged magnets or via prestressed springs or via an active system with a positive feedback booster.

Figure 4:
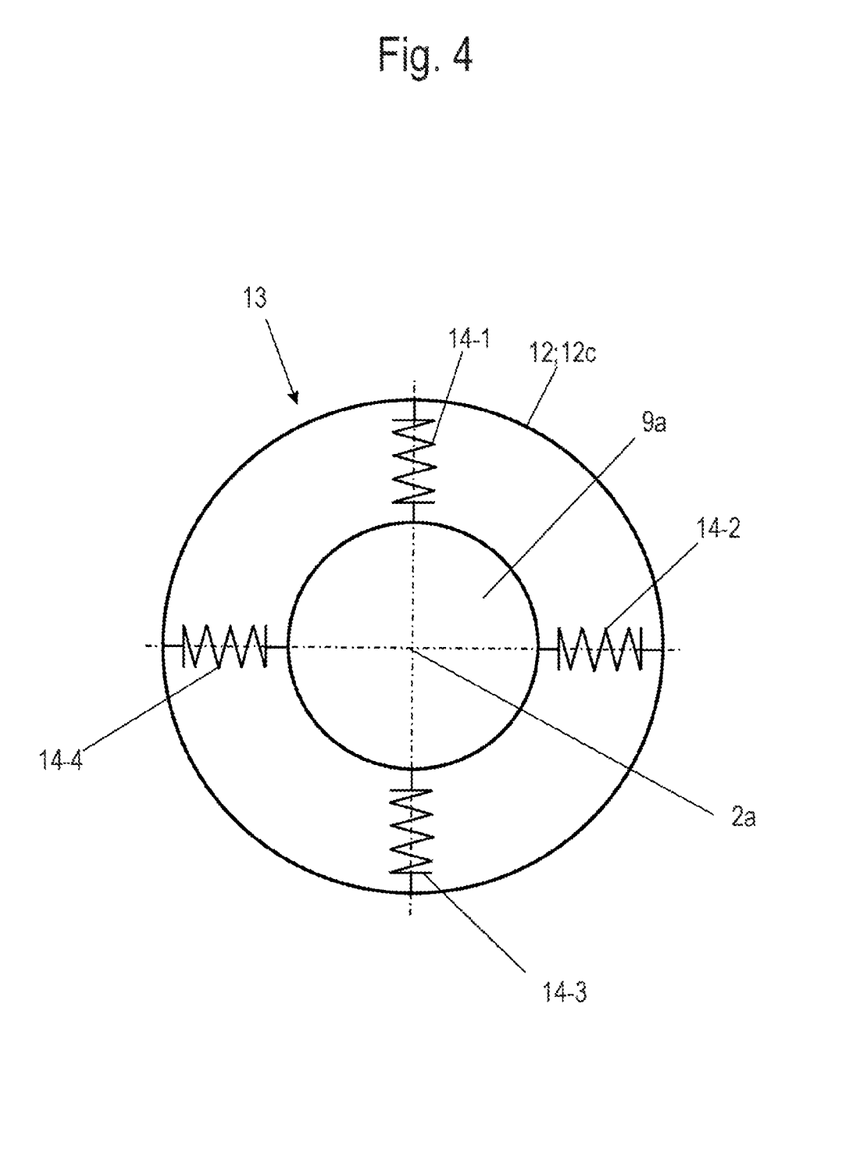
FIGS. 4-5 show diagrammatic views of exemplary embodiments of a feedback device with negative rigidities.

FIG. 4 shows a diagrammatic view of a first exemplary embodiment of the feedback device 13 with a negative rigidity with spring elements 14.

Figure 5:
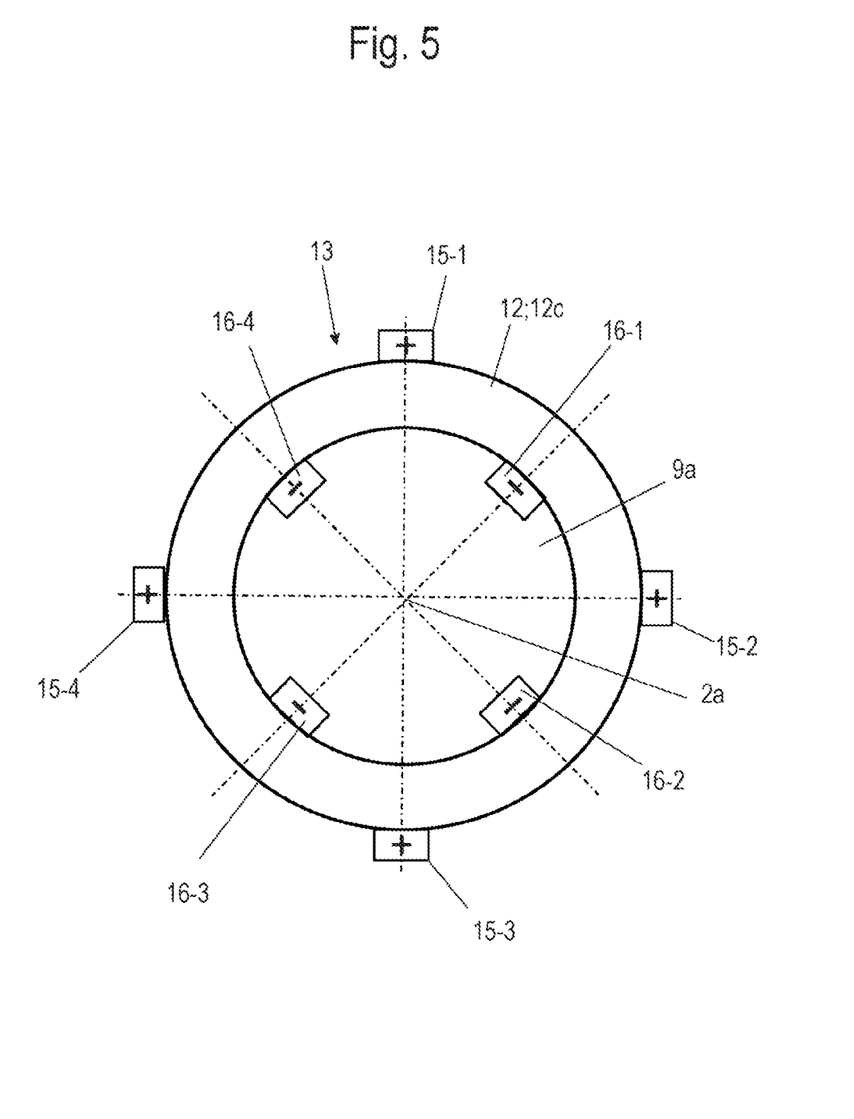

FIG. 5 illustrates a diagrammatic view of a second exemplary embodiment of the feedback device 13 with a negative rigidity with magnetic elements 15, 16.

In this first exemplary embodiment, the feedback device 13 has four spring elements 14-1, 14-2, 14-3 and 14-4 which are attached in a uniformly distributed manner on the circumference of the outer ring 9*a* of the secondary coupling 9 and on the opposite edge 12*c* of the vibration damper ring 12, and extend in the radial direction. Here, an angle between in each case two adjacent spring elements 14-1, 14-2, 14-3, 14-4 about the rotational axis 2*a* is 90°.

Each spring element 14-1, 14-2, 14-3, 14-4 consists here of at least one prestressed helical spring. More than four spring elements 14 can of course also be used.

In the second exemplary embodiment of the feedback device 13, four first magnetic elements 15-1, 15-2, 15-3, 15-4 are attached uniformly on the circumference of the edge 12*c* of the vibration damper ring 12 in such a way that their respective north pole (denoted here by "+") points toward the rotational axis 2*a*. Here, an angle between in each case two adjacent first magnetic elements 15-1, 15-2, 15-3, 15-4 about the rotational axis 2*a* is 90°.

In addition, four second magnetic elements 16-1, 16-2, 16-3, 16-4 are attached on the circumference of the outer ring 9*a* of the secondary coupling 9, in a uniform manner on the circumference of the outer ring 9*a* of the secondary coupling 9. Here, an angle between in each case two adjacent second magnetic elements 16-1, 16-2, 16-3, 16-4 about the rotational axis 2*a* is 90°, an angle between in each case a first magnetic element 15-1, 15-2, 15-3, 15-4 and a second magnetic element 16-1, 16-2, 16-3, 16-4 about the rotational axis 2*a* having a value of 45°.

The second magnetic elements 16-1, 16-2, 16-3, 16-4 are arranged in such a way that their south pole (denoted here by "−") points radially to the outside away from the rotational axis 2*a*, or their north pole points toward the rotational axis 2*a*.

Here, the magnetic elements 15-1, 15-2, 15-3, 15-4 and 16-1, 16-2, 16-3, 16-4 are arranged in such a way that the annular region between the outer ring 9a of the secondary coupling 9 and that inner side of the edge 12c which points toward the rotational axis 2a remains free.

Here, the magnetic elements 15-1, 15-2, 15-3, 15-4 and 16-1, 16-2, 16-3, 16-4 are configured as permanent magnets. It is also contemplated, however, that they can be configured as electromagnets. In this case, open-loop control of the feedback device 13 which is formed in this way is contemplated. Closed-loop control is also contemplated in a manner which is dependent on different parameters, for example rotational speed, engine load, etc. In this way, the above-indicated active system can be realized with a positive feedback booster.

More than four magnetic elements 15, 16 can also be used in each case.

Figure 6:
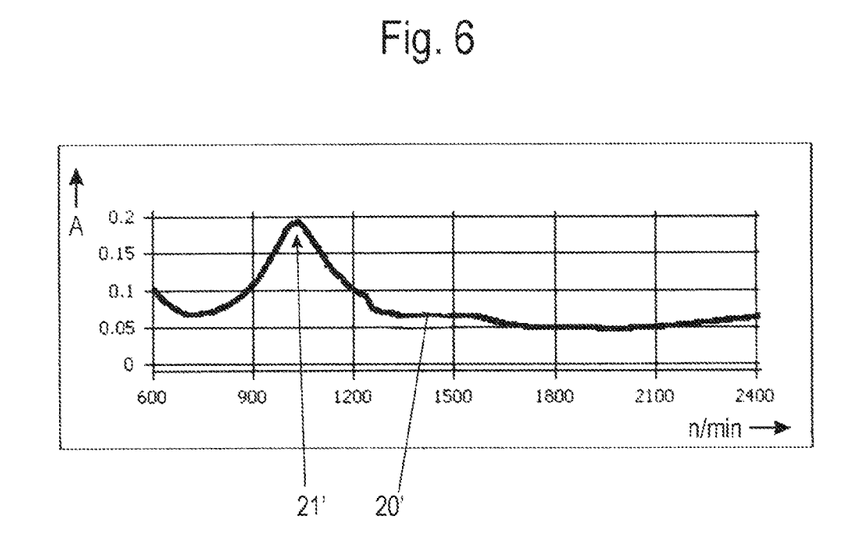
FIGS. 6-7 show graphical representations of torsional vibration curves.

FIG. 6 shows a graphical representation of a torsional vibration curve 20' with a torsional vibration damper 3 of the apparatus 100' from the prior art.

Figure 7:
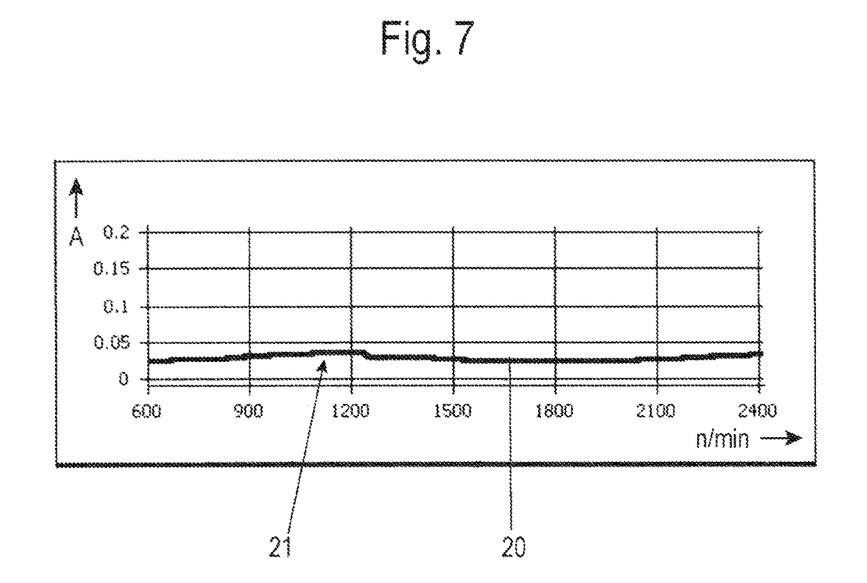

FIG. 7 shows a graphical representation of a torsional vibration curve 20 with the apparatus 100 according to the invention.

Tests have resulted in the torsional vibration curves 20', 20 in FIGS. 6 and 7.

The torsional vibration curve 20' is plotted with its amplitude A against a rotational speed n. At a rotational speed n of approximately 1050 l/min, an amplitude maximum which lies approximately in the middle of a range 21' between 900 and 1200 l/min at an amplitude value of approximately A=0.2 is shown in the prior art.

A reduction of torsional non-uniformities by approximately 75% can be possible by means of the apparatus 100 according to the invention. This is shown clearly by the torsional vibration curve 20 in FIG. 7. The amplitude A lies in the range 21 substantially below the amplitude maximum which occurs in the range 21' in FIG. 6. In addition, extreme amplitude maxima are no longer to be registered, and the amplitude A remains constantly below a value A=0.05 and runs without exceeding this value.

Figure 8:
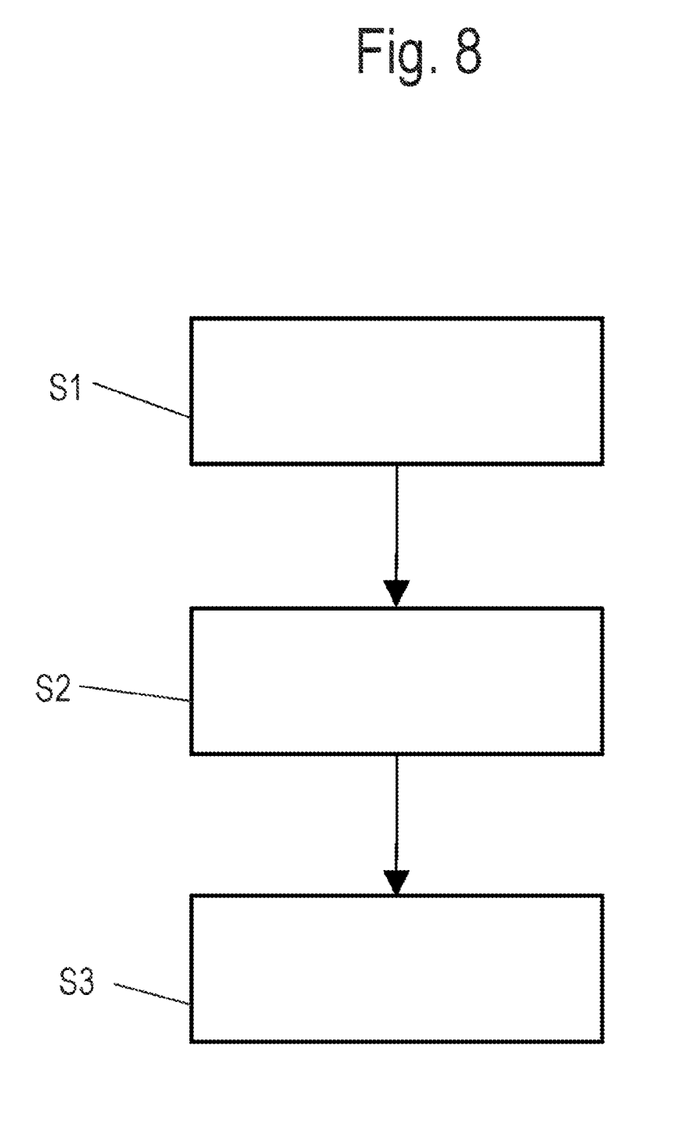
FIG. 8 shows a diagrammatic flow chart of a method according to the invention.

FIG. 8 shows a diagrammatic flow chart of a method according to the invention for damping torsional vibrations of a crankshaft 2.

In a first method step S1, an apparatus 100 is provided which has a torsional vibration damper 3 with a primary coupling 11 with a primary mass 4 and a vibration damper ring 12, and a secondary coupling 9 with an elastomer coupling ring 8.

A second method step S2 provides that torsional vibration damping takes place by means of a coupling of the vibration damper ring 12 to the primary mass 4, further damping being carried out by means of a coupling of the primary mass 4 to the secondary coupling 9.

Finally, in a third method step S3, damping of the torsional vibrations and simultaneous isolating of a drive train take place by means of a negative rigidity which brings about feedback of the secondary coupling 9 to the vibration damper ring 12.

In this way, the torsional non-uniformities or torsional vibrations can be reduced considerably, and there is improved isolation of the drive train. In addition, lower loading of the components of the drive train can be achieved, such as, for example, lower transmission wear. In the case of a generator, the "cleanness" of a sine wave of the generated alternating current can be increased, that is to say frequency stability and amplitude stability can be improved.

The invention is not restricted by way of the above-specified exemplary embodiment, but rather can be modified within the scope of the claims.

It is contemplated that the feedback device 13 has a combination of spring elements 14 and magnetic elements 15, 16.

The magnetic elements 15, 16 can also be combined as permanent magnets and electromagnets.

LIST OF DESIGNATIONS

1 Crankshaft arrangement
2 Crankshaft
2a Rotational axis
3 Torsional vibration damper
4 Primary mass
5 Secondary mass
6 Drive end, crankshaft
7 Inner ring
8 Elastomer coupling ring
9 Secondary coupling
9a Outer ring
9b Connecting section
10 Output
11 Primary coupling
11a Damper element
12 Vibration damper ring
12a Chamber
12b Sealing element
12c Edge
13 Feedback device
14-1; 14-2; 14-3; 14-4 Spring element
15-1; 15-2; 15-3; 15-4 First magnetic element
16-1; 16-2; 16-3; 16-4 Second magnetic element
17, 18, 19 Characteristic curve
20, 20' Torsional vibration curve
21, 21' Range
0100, 100' Apparatus
A Amplitude
F Force
S1; S2; S3 Method step
x Displacement

The invention claimed is:

1. A crankshaft arrangement for an internal combustion engine, comprising:
   a crankshaft;
   a torsional vibration damper with a primary mass and a vibration damper ring,
   wherein the primary mass is connected fixedly to the crankshaft, and the vibration damper ring and the primary mass are coupled via a viscous fluid,
   wherein the torsional vibration damper is attached to an output end of the crankshaft;
   an elastomer coupling ring by which the primary mass is coupled to a secondary coupling;
   a feedback device by which the torsional vibration damper is coupled to the secondary coupling,
   wherein the feedback device has a negative rigidity.

2. The crankshaft arrangement as claimed in claim 1, wherein
   the vibration damper ring of the torsional vibration damper is an outer vibration damper ring, to which the feedback device is coupled.

3. The crankshaft arrangement as claimed in claim 2, wherein
   the feedback device with the negative rigidity has spring elements.

4. The crankshaft arrangement as claimed in claim 3, wherein
the spring elements are attached in a manner which is distributed uniformly on a circumference of an outer ring of the secondary coupling and on an opposite edge of the vibration damper ring of the torsional vibration damper, and extend in a radial direction.

5. The crankshaft arrangement as claimed in claim 3, wherein
the spring elements in each case comprise at least one prestressed helical spring.

6. The crankshaft arrangement as claimed in claim 3, wherein
the feedback device with the negative rigidity has four or more spring elements.

7. The crankshaft arrangement as claimed in claim 1, wherein
the feedback device with the negative rigidity has magnetic elements.

8. The crankshaft arrangement as claimed in claim 7, wherein
first magnetic elements are attached in a manner which is distributed uniformly on a circumference of an edge of the vibration damper ring, and
second magnetic elements are attached in a manner which is distributed uniformly on a circumference of an outer ring of the secondary coupling.

9. The crankshaft arrangement as claimed in claim 8, wherein
the first magnetic elements point with a north pole toward the rotational axis, and
the second magnetic elements point with a north pole toward the rotational axis.

10. The crankshaft arrangement as claimed in claim 7, wherein
the feedback device with the negative rigidity has at least four or more first magnetic elements and at least four or more second magnetic elements.

11. The crankshaft arrangement as claimed in claim 10, wherein
an angle between in each case two adjacent first magnetic elements and an angle between in each case two adjacent second magnetic elements about a rotational axis is 90°, and
an angle in each case between a first magnetic element and a second magnetic element about the rotational axis is 45°.

12. The crankshaft arrangement as claimed in claim 7, wherein
the magnetic elements are permanent magnets.

13. The crankshaft arrangement as claimed in claim 7, wherein
that the magnetic elements are configured as electromagnets.

14. A method for damping torsional vibrations of a crankshaft of a crankshaft arrangement, comprising:
in a first method step, providing an apparatus which has a torsional vibration damper with a primary coupling comprising a primary mass and an outer vibration damper ring, and with a secondary coupling comprising an elastomer coupling ring,
in a second method step, torsional vibration damping taking place by way of coupling of the outer vibration damper ring to the primary mass, further damping being carried out by way of coupling of the primary mass to the secondary coupling, and
in a third method step, and at a same time as the damping of the torsional vibrations, isolating a drive train by way of a negative rigidity which brings about feedback of the secondary coupling to the outer vibration damper ring.

* * * * *